C. NEWMAN.
Fruit Jar.
No. 26,515.
Patented Dec. 20, 1859.
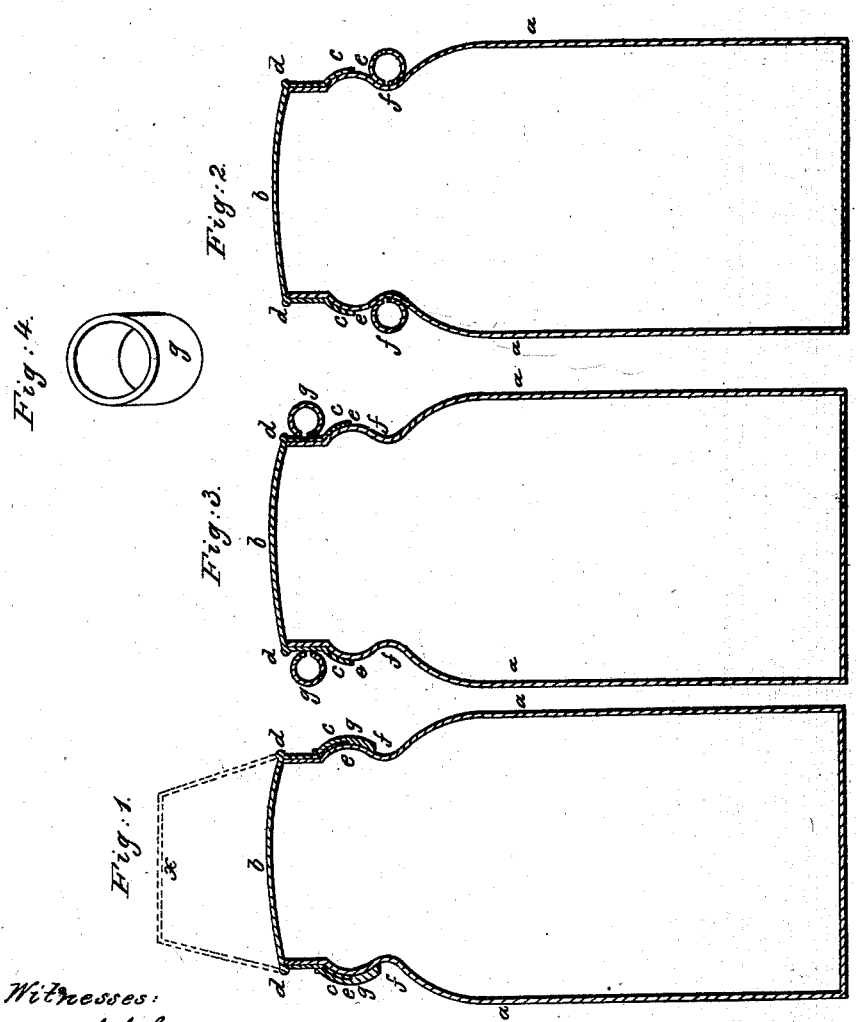
Witnesses:
James J. Johnston.
George P. Steck.
Inventor:
Carlton Newman.

UNITED STATES PATENT OFFICE.

CARLTON NEWMAN, OF BIRMINGHAM, PENNSYLVANIA.

IMPROVEMENT IN PRESERVE-CANS.

Specification forming part of Letters Patent No. 26,515, dated December 20, 1859.

*To all whom it may concern:*

Be it known that I, CARLTON NEWMAN, of Birmingham, in the county of Allegheny and State of Pennsylvania, have invented a new and useful Improvement in Preserve-Cans; and I do hereby declare that the following is a full and exact description thereof, reference being had to the accompanying drawings, and to the letters of reference marked thereon.

The nature of my invention consists in the use of a loose india-rubber band, in combination with a rib or ridge on and groove in the neck of the jar or can, and a flaring rim and rib or ridge on the lid of the jar or can, the whole being arranged and combined for the purpose of hermetically sealing jars or cans, and constructed in the manner hereinafter described.

In the accompanying drawings, Figure 1 is a central section of the jar, lid, and band, representing the position of the lid and band on the jar when properly arranged for preserving fruit. Fig. 2 is a central section of the lid, band, and jar, and represents the band rolled on the neck of the jar. Fig. 3 is a central section of the lid, band, and jar, and represents the band rolled up on the lid. Fig. 4 is a perspective view of the band.

The red dotted lines represent the form of the lid and the form of the rib or ridge on the neck of the jar when the lid is made of glass, china, porcelain, or delft ware.

The band represented in Fig. 4 is made much smaller in diameter than the lid or mouth of the jar, so that the contraction of the band will protect the joint formed on the rib or ridge of the neck of the jar perfectly and prevent the admission of air into the jar. The band is placed on the lid or neck of the jar by pressing the band over a conical-shaped instrument.

The dotted lines at $x$ will give an idea of the instrument and its position when used in placing the band on the lid. It will be impossible to place a band on the lid or neck of the jar with sufficient contracting power to make the jar perfectly air-tight without the aid of some suitable instrument.

$a$ is the jar. $b$ is the lid of the jar. $c$ is the flaring rim of the lid. $d$ is a rib or ridge of the lid. $e$ is the rib or ridge on the neck of the jar. $f$ is a groove in the neck of the jar. $g$ is the india-rubber band.

By the arrangement of the flaring rim $c$ of the lid and the ridge $e$ on the neck of the jar the joint between the lid and jar is brought on or near to the center of the rib $e$, thereby causing the greatest pressure of the band to be directly over the joint, thus making the jar perfectly air-tight by the use of the band $g$ in connection with the flaring rim $c$ of the lid $b$ and the rib or ridge $e$ on the neck of the jar. By the arrangement of the flaring rim $c$ and the rib or ridge $d$ of the lid $b$ the india-rubber band will be held on the lid. The groove $f$ in the neck of the jar, in connection with the rib or ridge $e$, will hold the band down on the neck of the jar. Thus a detached band may be used and shifted from the lid down onto or up from the neck of the jar onto the lid at pleasure, without the liability of having to use an instrument in replacing the india-rubber band a second time on the lid or on the neck of the jar, and without the liability of loosing the band. By the arrangement of the flaring rim on the lid and the rib or ridge on the neck of the jar the lid will be held down firmly by the contraction of the band in its width, for it will be readily observed that the band, when placed over the flaring rim of lid and the rib or ridge on the neck of the jar, will contract in its width as well as toward the center of its diameter. By the arrangement of the rib or ridge $e$ and the groove $f$, when any defect is found in the lid which would prevent the perfect sealing of the jar, the band can be readily shifted down onto the neck of the jar and there held by the rib or ridge $e$ until another lid is placed on the jar, and should any cause arise demanding a change of the lid the change can be made with ease and speed by this arrangement of the rib or ridge $e$ and the groove $f$.

The operation of sealing the jar is as follows: Having the band placed on the lid, as seen in Fig. 3, the lid is placed on the jar and the band unrolled down over the flaring rim of the lid and over the rib or ridge on the neck of the jar. When the band is placed on the neck of the jar, as seen in Fig. 2, the band is unrolled up over the rib or ridge on the neck of the jar and over the flaring rim of the lid.

The unsealing of the jar is performed by simply rolling the band onto the lid or neck of the jar. The proper position of the band is represented in Fig. 1.

I am aware that an india-rubber band, permanently attached to the lid of a jar and used in connection with a metal clamp for the purpose of sealing fruit jars or cans, has been used, such device being seen in the patent of H. G. Dayton, patented June 8, 1858. Therefore I do not claim the general use of india-rubber bands for the purpose of sealing fruit jars or cans; but What I do claim as of my invention is—

The use of the loose or detached elastic band when used in connection with the flaring rim $c$ on lid $b$, rib or ridge $e$ on and groove $f$ in the neck of the jar, or the equivalents of said rim, ridge, and groove, arranged, constructed, and used as herein described, and for the purpose set forth.

CARLTON NEWMAN.

Witnesses:
JAMES J. JOHNSTON,
GEORGE P. STECK.